(12) United States Patent
Phatak

(10) Patent No.: US 12,037,271 B2
(45) Date of Patent: Jul. 16, 2024

(54) SEA WATER DE-SALINATION METHODS AND APPARATUSES

(71) Applicant: Dhananjay Phatak, Ellicott City, MD (US)

(72) Inventor: Dhananjay Phatak, Ellicott City, MD (US)

( * ) Notice: Subject to any disclaimer, the term of this patent is extended or adjusted under 35 U.S.C. 154(b) by 481 days.

(21) Appl. No.: 17/280,827

(22) PCT Filed: Sep. 27, 2019

(86) PCT No.: PCT/US2019/053518
§ 371 (c)(1),
(2) Date: Mar. 26, 2021

(87) PCT Pub. No.: WO2020/069358
PCT Pub. Date: Apr. 2, 2020

(65) Prior Publication Data
US 2022/0002170 A1    Jan. 6, 2022

Related U.S. Application Data

(60) Provisional application No. 62/738,110, filed on Sep. 28, 2018.

(51) Int. Cl.
*C02F 1/44* (2023.01)
*B01D 61/02* (2006.01)
*C02F 103/08* (2006.01)

(52) U.S. Cl.
CPC .......... *C02F 1/441* (2013.01); *B01D 61/025* (2013.01); *B01D 2313/243* (2013.01);
(Continued)

(58) Field of Classification Search
CPC .......... B01D 2311/14; B01D 2313/243; B01D 61/025; C02F 1/441; C02F 2103/08;
(Continued)

(56) References Cited

U.S. PATENT DOCUMENTS 9,617,172 B1 * 4/2017 Baski ...................... C02F 1/441
10,125,035 B2 * 11/2018 Schmidt ............... H02K 7/1807
(Continued)

FOREIGN PATENT DOCUMENTS

FR        2484391 A1 * 12/1981 ............. B01D 63/10
GB        1141138 A   *  1/1969 ............. B01D 61/10

OTHER PUBLICATIONS

English Translation of FR 2484391 A1 from espace.net website (Year: 1981).*
(Continued)

*Primary Examiner* — Terry K Cecil
(74) *Attorney, Agent, or Firm* — Perkins Coie LLP

(57) ABSTRACT

Systems, apparatus and methods for desalination of ocean water using gravity force are described. One example method of desalinating ocean water includes providing a structure having a reverse osmosis membrane affixed to a first end, submerging the structure to a depth in a reservoir of salt water, wherein the depth is a function of a critical pressure of activation of operation of the reverse osmosis membrane, allowing a hydrostatic pressure at the depth to force salt water from the reservoir through the reverse osmosis membrane to cause fresh water to accumulate within a cavity on an inside of the structure; and making the fresh water available for an external use.

18 Claims, 8 Drawing Sheets

(52) U.S. Cl.
CPC .... *C02F 2103/08* (2013.01); *C02F 2201/009* (2013.01); *C02F 2301/066* (2013.01)

(58) Field of Classification Search
CPC ......... C02F 2201/009; C02F 2301/066; Y02A 20/131; Y02A 20/212; Y02A 20/141; Y02W 10/33; Y02W 10/37
See application file for complete search history.

(56) References Cited

U.S. PATENT DOCUMENTS

| | | | | |
|---|---|---|---|---|
| 10,221,083 | B2* | 3/2019 | Constantz | H05K 7/2079 |
| 2009/0250398 | A1 | 10/2009 | Meller | |
| 2010/0051546 | A1* | 3/2010 | Vuong | B01D 61/027 |
| | | | | 210/124 |
| 2010/0270236 | A1* | 10/2010 | Scialdone | C02F 1/441 |
| | | | | 210/636 |
| 2010/0276369 | A1 | 11/2010 | Haag | |
| 2011/0180465 | A1 | 7/2011 | Richetti | |
| 2014/0339169 | A1 | 11/2014 | Zeren et al. | |
| 2016/0075569 | A1 | 3/2016 | Constantz | |
| 2017/0089178 | A1 | 3/2017 | Schmidt et al. | |
| 2017/0355624 | A1 | 12/2017 | Baski | |

OTHER PUBLICATIONS

Andrew Gong, Aurora Solar Inc., "San Diego Gas and Electric's New Time of Use Rates: How Solar Savings Are Changing, Backed by Data," Dec. 2017, Available: https://blog.aurorasolar.com/sdge-new-time-of-use-rates-december-2017.

Carol Hodanbosi and Jonathan G. Fairman, "Fluids pressure and depth," NASA, Aug. 1996, Available: https://www.grc.nasa.gov/www/k-12/WindTunnel/Activities/fluid_pressure.html.

Chem Team, "Osmosis equation," Available: http://www.chemteam.info/Solutions/Osmosis-Equation.html.

City of San Diego, "Water rates effective Jan. 1, 2022," Available: https://www.sandiego.gov/water/rates/rates.

Donald E. Simanek, "The Museum of Unworkable Devices Annex." Last modified: 2011, Available: https://www.lockhaven.edu/~dsimanek/museum/osmosis.htm.

G. Shtelman, "Large-Scale Desalination," Water and Wastes Digest, May 2017, Available: https://www.wwdmag.com/desalination/large-scale-desalination.

Solar Tech. Inc., "2017 SDGE Rate Changes," Last modified: 2017, Available: https://solartechonline.com/blog/2017-sdge-rate-changes/.

Wikipedia, "Block island wind farm," Last modified: Sep. 8, 2017, Available: https://en.wikipedia.org/wiki/Block_Island_Wind_Farm.

Wikipedia, "Desalination," Last modified: Sep. 2017, Available: https://en.wikipedia.org/wiki/Desalination.

Wikipedia, "Seawater," Last modified: Sep. 2017, Available: https://en.wikipedia.org/wiki/Seawater.

Wikipedia, "Thermocline," Last modified: Jul. 2017, Available: https://en.wikipedia.org/wiki/Thermocline.

International Search Report and Written Opinion mailed on Jan. 13, 2020 for International Application No. PCT/US2019/053518 filed on Sep. 27, 2019 (13 pages).

Israeli Patent Office, Notice of Deficiencies for Patent Appl. No. 281940, mailed on Mar. 14, 2024, 4 pages.

* cited by examiner

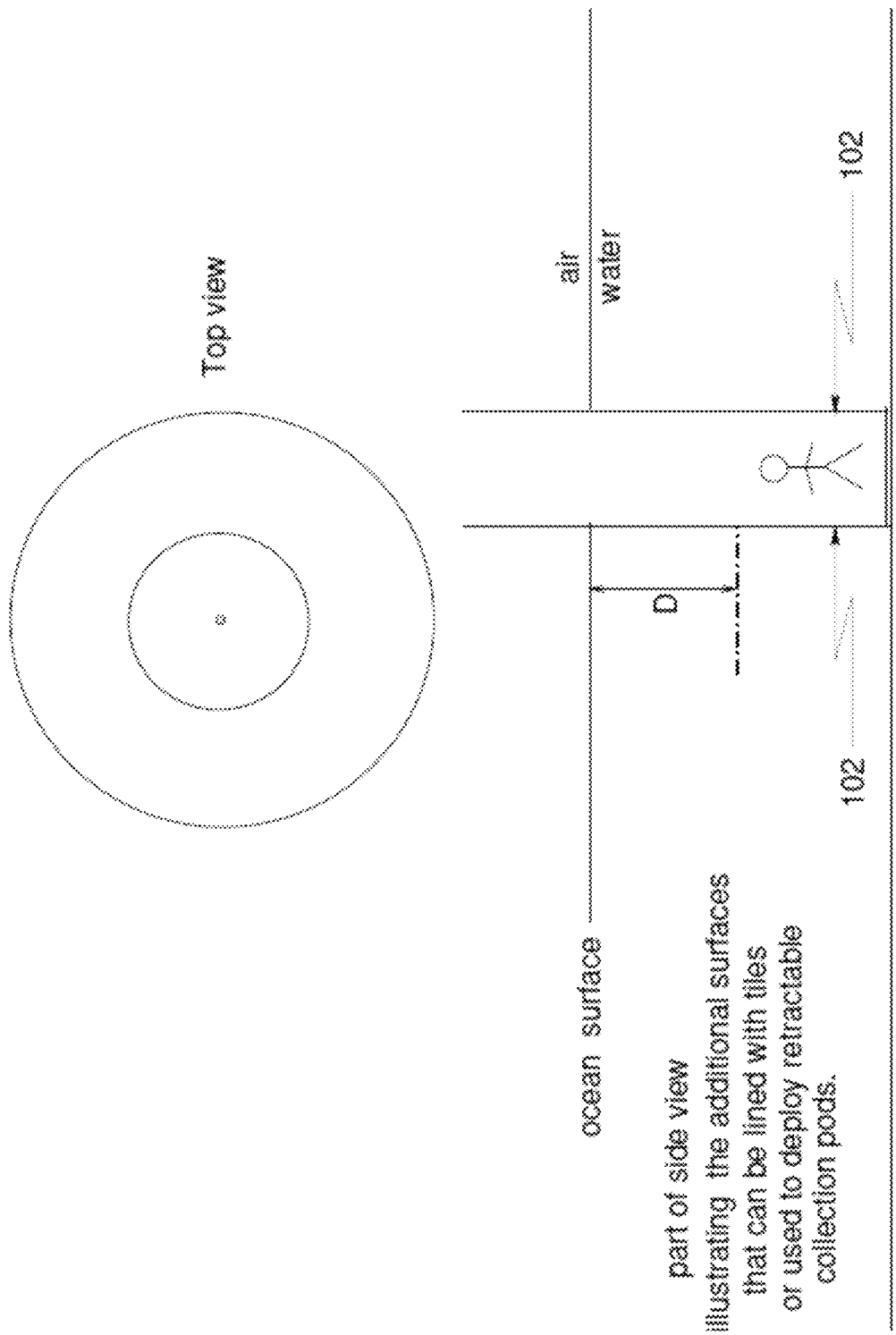

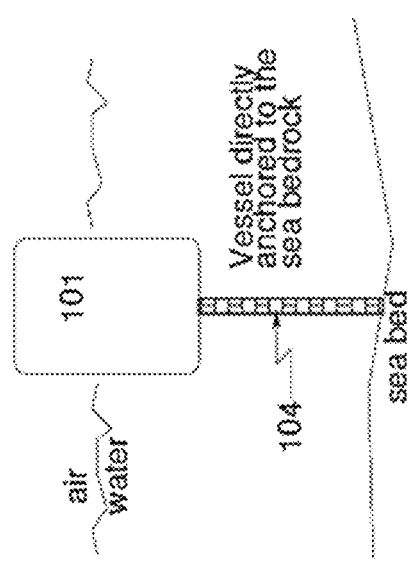
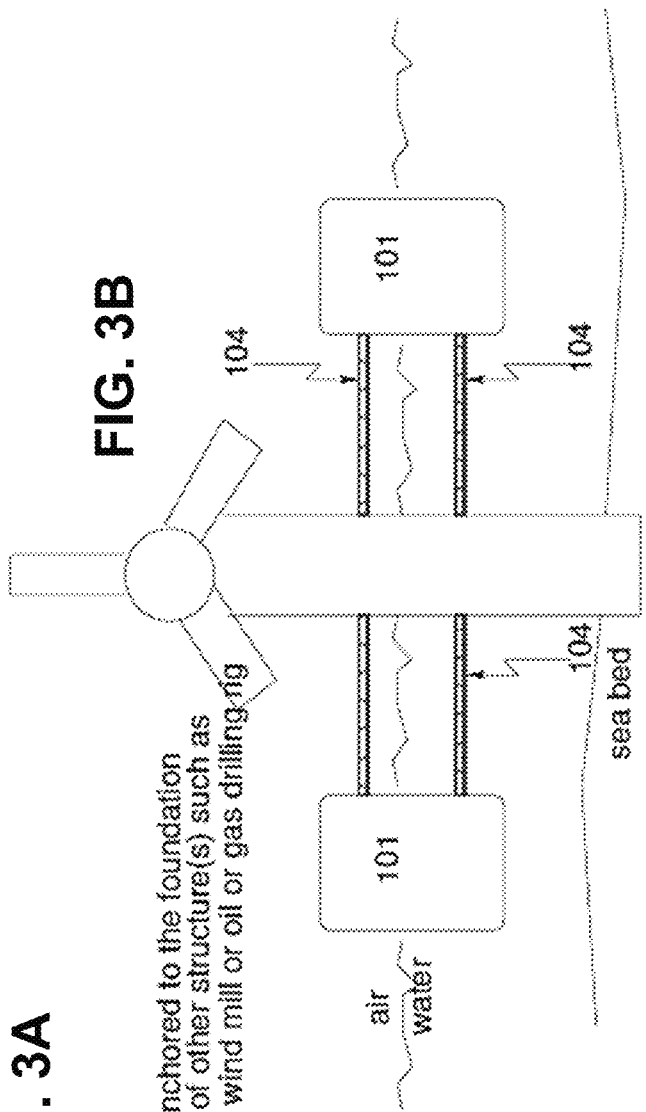

700

Providing a structure having a reverse osmosis membrane affixed to a first end
702

Submerging the structure to a depth in a reservoir of salt water, wherein the depth is a function of a critical pressure of activation of operation of the reverse osmosis membrane
704

Allowing a hydrostatic pressure at the depth to force salt water from the reservoir through the reverse osmosis membrane to cause fresh water to accumulate within a cavity on an inside of the structure
706

Making the fresh water available for an external use
708

FIG. 7

SEA WATER DE-SALINATION METHODS AND APPARATUSES

CROSS-REFERENCE TO RELATED APPLICATION(S)

The present application claims the benefit of priority from U.S. Provisional Patent Application 62/738,110, entitled "NEW, ULTRA LOW NET ENERGY, SELF CONTROLLING AND STABILIZING SEA WATER DE-SALINATION METHOD AND APPARATUS," filed on Sep. 28, 2018. The entire contents of this provisional application are incorporated by reference herein.

The present application is a U.S. National Phase Entry of International PCT Application No. PCT/US2019/053518 filed on Sep. 27, 2020, entitled "SEA WATER DE-SALINATION METHODS AND APPARATUSES," which is based upon and claims priority to U.S. Provisional Application No. 62/738,110, filed Sep. 28, 2019, the entire contents of both of which are incorporated herein by reference in their entirety.

TECHNICAL FIELD

The present document relates to techniques for water de-salination.

BACKGROUND

In the last century, while world population and per-capita water consumption have steadily increased, the total amount of fresh water supply has not followed the same trend. Desalination is one technique that promises to provide fresh water supply by converting sea water into fresh water that is suitable for human consumption.

SUMMARY

The present document describes techniques that can be embodied into large-scale desalination systems for generation of fresh water from sea water.

In one example aspect, a method of desalinating ocean water is disclosed. The method includes providing a structure having a reverse osmosis membrane affixed to a first end, submerging the structure to a depth in a reservoir of salt water, wherein the depth is a function of a critical pressure of activation of operation of the reverse osmosis membrane, allowing a hydrostatic pressure at the depth to force salt water from the reservoir through the reverse osmosis membrane to cause fresh water to accumulate within a cavity on an inside of the structure; and making the fresh water available for an external use.

In another example aspect, a desalination apparatus is disclosed. The apparatus includes an elongated structure having a first end submerged undersea at a depth D, and a second end at or above sea water level, a reverse osmosis membrane affixed to the first end, and a water pump coupled to an inside cavity of the elongated structure and configured to pump water from the inside cavity towards land. The depth D is sufficient to allow reverse osmosis to occur across the reverse osmosis membrane due to pressure differential across the reverse osmosis membrane.

In another example aspect, a method to co-generate desalinated (fresh) water together with electricity wherein the amount of water and electricity generated and/or sold can by dynamically optimized to maximize revenue/profits is disclosed.

In another example aspect, a method to co-generate desalinated water together with any resource from the deep ocean, including natural gas, and/or crude-oil and/or hydrates and/or rare minerals is disclosed. This can be achieved by using the methods described herein so that the cost of the infrastructure needed can be amortized over at least two independent and valuable products that can be sold.

In another example aspect a method to co-generate at least 3 distinct products is disclosed. The products include (1) desalinated water, (2) electricity and (3) natural gas and/or deep sea crude-oil. In this method, even a smallest amount of natural gas or oil that is necessarily wasted (burned as a small plume/pilot to relieve excess pressure) during conventional extraction process is instead put to use to lift the filtered water by coupling the energy wasted in pressure relief plumes with electricity generated by renewables.

In another example aspect, a method that provides technical solution to amortize the cost of any deep-sea infrastructure for any purpose such as a transportation tunnel over an independent highly profitable commodity, namely fresh water, is disclosed. The method includes generating potable de-salinated water, simply by anchoring the de-salination apparatuses demonstrated herein to the deep sea infrastructure originally intended for any other purpose.

In yet another example aspect, a method may include performing desalination as above and include co-locating aqua-farms and/or fisheries and/or other installations around the de-salination infrastructure to benefit from the synergy of multiple independent product lines thereby reducing the overall cost is disclosed.

In another example aspect, a method of desalinating ocean water using the above-described desalination apparatus is disclosed.

These, and other aspects, are described throughout the present document.

BRIEF DESCRIPTION OF THE DRAWINGS

FIG. 2C shows an example configuration in which retractable collection pods are utilized in a desalination system.

FIGS. 3A-B show a number of ways by which a desalination vessel or multiple desalination vessels can be anchored.

FIG. 7 is a flowchart for an example method of desalination of ocean water.

DETAILED DESCRIPTION

De-salination technology holds the promise to provide large scale fresh water source to meet demands of growing world population. Current use of desalination technology has been limited due to problems in scaling for large scale water production and associated costs of performing desalination, both capital expenses and operational expenses.

The present document provides methods and systems that can be incorporated into embodiments that can perform large scale desalination of sea water with very low net energy expenditure. Some embodiments can be completely and inherently self-controlling and stabilizing. Considering the large amount of ocean water available in comparison with total human consumption of water, the technology disclosed in the present document may provide ways by which practically unlimited supply of fresh water can be generated after the infrastructure for desalination is built according to the methods and apparatuses described herein.

After the initial expenditure of building infrastructure, further operations may include routine maintenance such as occasional replacement of the Reverse-Osmosis membranes, and/or repairing/replacing/washing the blades of a wind-mill erected in the ocean. As described in the present document, in some embodiments, the only significant energy required during regular operation is the energy needed to physically lift the filtered water from a critical depth D. As shown in this document; this "operating" energy needed to lift filtered water can be generated from renewable and/or sustainable sources such as offshore or on-shore wind-mills and/or solar-panel-farms and/or hydroelectric stations and/or tidal-energy harvesting systems and/or wave energy harvesting systems. Those familiar with the art will understand that, if desired; any conventional (fuel-burning) methods of electricity generation; such as; nuclear plants or oil/natural gas-powered generators; etc.; can be coupled into some embodiments.

Figure 1:
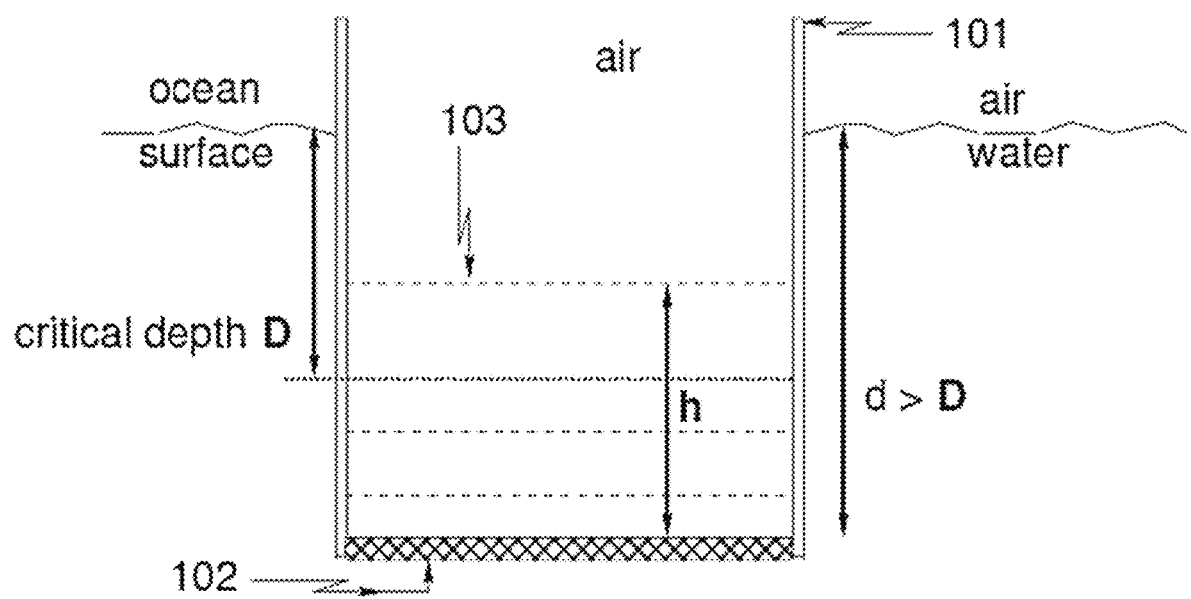
FIG. 1 is a schematic diagram for a water de-salination operation.

FIG. 1 is a schematic diagram illustrating an example embodiment.

With reference to FIGS. 1-6, the following reference numerals are used (see Table 1, next).

TABLE 1

| number or symbol | component description |
|---|---|
| 101 | Main vessel (for example, a cylinder) with osmotic membrane fitted at the bottom and the top open to ambient air |
| 102 | The osmotic membrane that filters sea-water |
| 103 | de-salinated water that collects at the bottom of the vessel |
| 104 | Anchors (can be flexible or rigid) |
| 105 | Service shaft dug on land near a steep sloped deep shore |
| 106 | Air pressure equalizer conduit(s) |
| 107 | Underground reservoir (collects fresh water, dug on land) |
| D | The critical depth below the sea-surface, at which, the pressure difference across the membrane is sufficient to start and sustain Reverse-Osmosis (abbreviated RO) |
| d or d | the designed operating depth (membrane is positioned at d > D) |
| h or h | height of the column of filtered water inside the vessel |

Desalination of sea water has likely been a human aspiration since the dawn of time. Methods including Solar evaporation, Multi-stage flash distillation, Multiple-effect distillation, Vapor-compression distillation, Freeze-thaw, Electrodialysis reversal, and Reverse Osmosis (RO) are in use today for industrial scale desalination. Out of all these methods, RO is one of the most energy efficient. It is therefore natural that large scale sea water desalination plants prefer deploying RO methods. An example is the huge sea water desalination plant operated by Sorek Desalination Ltd. (SDL) near Tel Aviv, Israel. Similar facilities are being considered, being developed or have already been deployed in many other countries in various geographical terrains and associated climatic condition.

Osmotic membranes available in the market today can accomplish the process of reverse osmosis when the pressure differential exceeds approximately 25 atmospheres.

As illustrated in FIG. 1, consider a hollow tube or vessel of a suitable length (as described herein). Cover its bottom surface with osmotic membrane and let the top be open to ambient air. As this vessel is inserted deeper and deeper into the sea, the pressure difference across the bottom surface increases. At some critical depth denoted by the symbol "D", the pressure difference is sufficient to effectively perform the process of reverse osmosis. Suppose that the vessel is inserted further to a depth d>D. Then reverse osmosis starts filling the bottom of the vessel with de-salinated sweet (or fresh) water.

Next, we derive the height h inside the vessel (measured from the bottom, i.e., the inside surface of the osmotic membrane) to which the column of filtered water rises at equilibrium. Let $p_t$ be the minimum (or threshold) pressure required to sustain the Reverse Osmosis process. Let $p_t$ be achieved at depth D below the sea-surface. Let $p_s$ denote the pressure at the operating depth d in the sea (note that d>D must be satisfied for the scheme to work). Let $p_i$ denote the pressure inside the vessel at its bottom (i.e., at the inside surface of the osmotic membrane) when the Reverse Osmosis just stops or just starts (in other words, when the difference of pressure outside and inside equals the critical threshold pressure needed to initiate RO). Then at equilibrium, pressures on both sides of the membrane(s) satisfy $$(1 \text{ Atmosphere} + p_s) - (1 \text{ Atmosphere} + p_i) = p_t \quad (1)$$

In the above equation, the 1 Atmosphere pressure exists at the surface of the ocean as well as inside the vessel (since the top of the vessel is open). Depending on location of the system, the number "1" of the atmospheric pressure may change, but an important characteristic is that the actual atmospheric pressure number will be same on both sides of the equation. The above equation simplifies to:

$$p_s - p_i = p_t \text{ or, equivalently to } p_i = p_s - p_t \quad (2)$$

Using the well-known formula for hydro-static pressure p at a depth d inside a fluid of density ρ:

$$p = \rho \cdot g \cdot d \text{ where } g = \text{the acceleration due to gravity} \quad (3)$$

$$g \approx \text{a constant at and near the surface of the earth} \approx 9.8 \frac{\text{Meters}}{\text{second}^2}$$

Let
$\rho_s$=the density of sea-water, and
$\rho_f$=the density of filtered water
Then it is seen that $$\rho_f \cdot g \cdot h = \rho_s \cdot g \cdot (d - D) \Rightarrow h = \frac{\rho_s}{\rho_f}(d - D) \quad (4)$$

Since sea water contains salt and other impurities that the filtered water does not, then sea water heavier than filtered water. Therefore $$\frac{\rho_s}{\rho_f} > 1 \Rightarrow h > (d - D) \quad (5)$$

In other words, inside the vessel (tube), the column of filtered water will rise to a level (slightly) above the critical depth D when the pressure difference reaches the threshold value required to sustain RO.

The process is self-stabilizing, or in other words, if the vessel is simply held in its place without doing anything, then once the level of sweet water reaches the equilibrium level (height h); the Reverse Osmosis will stop or will be practically negligible.

If, however, the collected sweet water is pumped up to the surface (approximately through the height D) then the water level inside the vessel drops and then reverse osmosis can again re-fill the vessel up-to the equilibrium level.

For the sake of simplicity, the pump or water-wheel or another suitable mechanism used to "lift" the filtered water to deliver it to the shore (land) is not shown in any of the diagrams.

Using this technique, ocean can be seen as a near-unlimited supply of de-salinated sweet water at a depth D. In this system, the only significant energy spent is that which is required to lift the filtered water through a height; which approximately equals D (but less than D).

Looking at this system from a conservation of energy perspective, the total energy required for desalination must equal the energy spent in lifting the filtered water plus the energy required to dissolve the excess salt (which is filtered out at the bottom of the osmotic membrane). Any land-based desalination will spend some energy to carry the concentrated stream (generated as a result of the RO process) away from the membranes. In designs based on techniques described herein, this energy is in effect naturally provided by the sea and phenomena in the sea such as tides and or currents that ensure that the salinity of the sea remains almost constant across oceans. In other words, the salt that gets filtered out at the bottom of the osmotic membrane, into the sea spontaneously dissolves in the surrounding sea water maintaining the salinity; since the supply of sea water is practically infinite compared with the amount of salt filtered out.

Furthermore, a method that does not exploit the naturally occurring underwater hydrostatic pressure in the sea to perform the forced filtration in Reverse Osmosis would necessarily require more energy to deliver the same amount of end product, i.e., the same volume of filtered potable water; when compared with systems disclosed herein, that exploit the naturally occurring underwater pressure to accomplish Reverse Osmosis.

Methods that do not use the natural hydrostatic pressure in the sea for desalination are henceforth collectively referred to as "Land Based Reverse Osmosis" methods or for the sake of brevity, simply as "land based" methods; irrespective of whether the forced filtration happens on land or above the surface of the sea or any other place.

Accordingly, another advantageous aspect of the disclosed technology is that given any Reverse Osmosis (RO) based seawater desalination method and apparatus; wherein; the forced filtration in RO is carried out without using the naturally occurring hydrostatic or hydrodynamic pressure(s) in the sea; would use greater energy per unit of fresh water produced according to the disclosed techniques, It will be appreciated that a method that uses the technique illustrated in FIG. 1 can be used for generating fresh water based on natural underwater pressure in ocean.

Furthermore, a corresponding apparatus design that exploits the naturally occurring underwater hydrostatic pressure may include the operating depth d that is minimal.

Embodiments of the method and the apparatus will deliver the same volume of filtered water as the land based scheme to generate the same volume of the end product, namely, fresh water.

Embodiments of the method and apparatus will expend less amount of energy than the land based scheme.

Furthermore, it may be possible to put into operation a number of such systems spread around the world that also exploit the naturally occurring underwater hydrostatic pressure.

Suppose that the pressure-differential deployed in the land based method is $p_l$; wherein; the subscript l indicates "land-based".

Let $W_s$=work (energy) needed to push volume v of seawater at a pressure differential $p_l$ through the RO membrane The work energy can be represented as:

$$W_s = V \times p_l \qquad (6)$$

To compare it to the energy required of disclosed methods, assume that $p_l$ is realized (i.e. exists) at some depth H below the surface of the sea. Then, from Relation (3) above, it is seen that $p_l$=the hydrostatic pressure-differential at depth–
$$H = \rho_s \cdot g \cdot H \qquad (7)$$

In a practical system, H>D is satisfied; since D is defined to be the minimum/threshold depth at which pressure differential reaches the value at which Reverse Osmosis can occur.

Substituting the value of $p_l$ from (7) into (6), it is seen that $$W_s = V \times p_l = V \times (\rho_s \cdot g \cdot H) \qquad (8)$$

To realize the corresponding minimal depth design in the novel scheme, simply set the operating depth d=H; or in other words, position the membrane at depth H.

Then, in the corresponding new scheme, the column of filtered water rises to a level that is higher than the depth D; as illustrated in FIG. 1 together with Relation (5) derived above. Therefore, in embodiments according to the disclosed techniques, the same amount or volume v of filtered water is simply lifted through a height no more than D.

Let $W_f$=work (energy) needed to lift volume v of filtered water thru height D
then $W_f = (V \times \rho_f) \cdot g \cdot D$ and therefore, the ratio of the energies required is $\qquad (9)$ $$\frac{W_s}{W_f} = \frac{\rho_s}{\rho_f} \cdot \frac{H}{D} \qquad (10)$$

Since $\rho_s > \rho_f$ and H>D then, it follows that $W_s > W_f$ which proves the superiority of the disclosed scheme. $\qquad (11)$ Moreover, $$\frac{\rho_s}{\rho_f} \approx 1.025 = \text{a constant, so that} \qquad (12)$$

$$\frac{W_s}{W_f} \approx 1.025 \left(\frac{H}{D}\right) \qquad (13)$$

The last Relation, i.e. (13), shows that the higher the operating pressure $p_l$ used in any land-based RO scheme; the lesser is the energy efficiency of that method; relative to the techniques disclosed in the present document.

Finally, note that the operating depth d (illustrated in FIG. 1) is a design parameter. Deploying a depth d>H>D practically does not affect the energy consumed in embodiments (actually, the energy consumed may be slightly lesser when d>H; because the equilibrium height h of the column of fresh water is slightly higher; which in turn implies that the filtered water needs to be lifted through a slightly smaller height).

Furthermore, operating at a depth d>H is equivalent to a land based RO system that deploys a pressure>$p_j$.

In other words, simply by increasing the operating depth; the disclosed technique delivers at least the same amount (volume) of fresh water that a land based system with higher pressure capacity would have been able to deliver; without the additional energy that must be spent in order to achieve a higher pressure difference in a land-based RO system.

SOME EXAMPLE EMBODIMENTS

In this document the term optimization or optimize is intended to cover joint optimization of all parameters as well as joint and/or independent optimizations of any number of sub-groups of design parameters.

In general, the vessel to be inserted and held at the designed depth d in the sea can have various sizes and/or shapes. Either of these parameters; namely, the size and or shape of the vessel can be optimized independently or jointly to meet a wide variety design goals and constraints including those if any; specific to a particular geographic location.

Some of the possible configurations of the vessel are illustrated in FIGS. 2A-6. The placement of the osmotic membranes on the vessel can also be optimized to meet a wide variety of design goals and/or constraints. For example, if the membranes are fragile; then small pieces of membrane supported by strong material should be used to "tile/cover" the surface across which reverse osmosis is designed to occur.

The word/term "vessel" is used in a generic manner herein; and includes a wide range of actual realizations such as a single container lined with tiles that firmly support and hold the RO membranes; or multiple containers arranged in a two- or three-dimensional grid in the ocean. The vessels can therefore be thought of as "collection pods."

One example of the overall structure is illustrated in FIG. 2C, wherein it will be clear that humans and robots can operate inside the structure at normal atmospheric pressure. Retractable collection pods can be deployed through the surfaces shown (102) so as to minimize the need to perform maintenance in the open sea at depth D or below. The paths to direct the filtered water to a collection tank are omitted for the sake of clarity. Likewise, the collection tank itself as well as pumping or water-lifting mechanisms are also not shown in order to avoid cluttering.

The water filtered by the collection pods may be aggregated in a single reservoir or multiple reservoirs which themselves could be built in the ocean the and tethered or anchored; or could be floating structures loosely held in place by various mechanisms.

Floating reservoirs of filtered water are feasible because filtered water is lighter than seawater and light strong material are now available to create a "floating" tank or storage structure that is for example; partially submerged depending upon the amount of filtered water collected. Such floating reservoirs may preferably be loosely tethered to bedrock or other static structures so that they are not carried away by the ocean currents.

Figure 4:
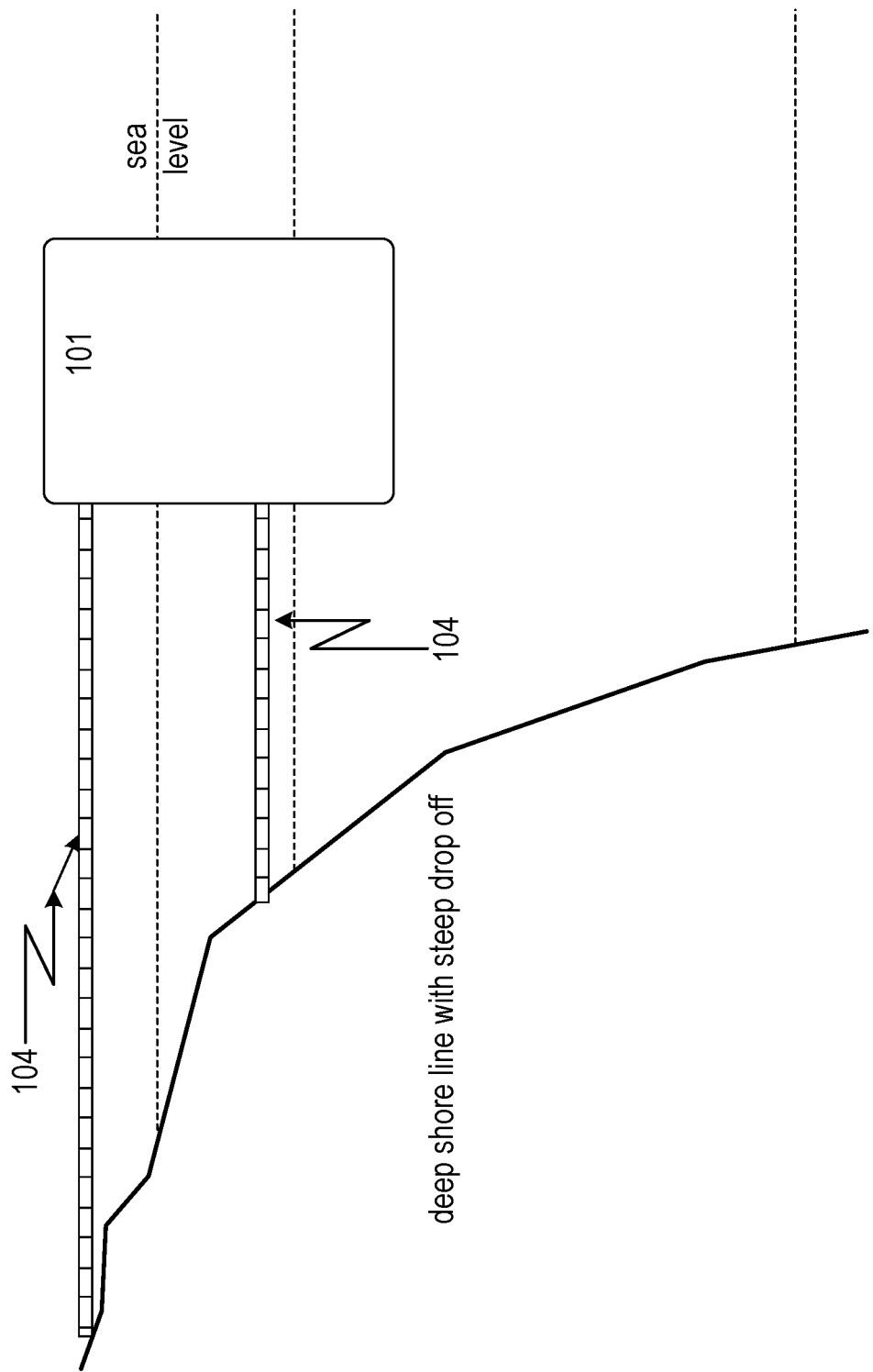
FIG. 4 shows an example of a vessel(s) can be anchored directly to the rocks on land of a steeply-sloping shore line
Figure 5:
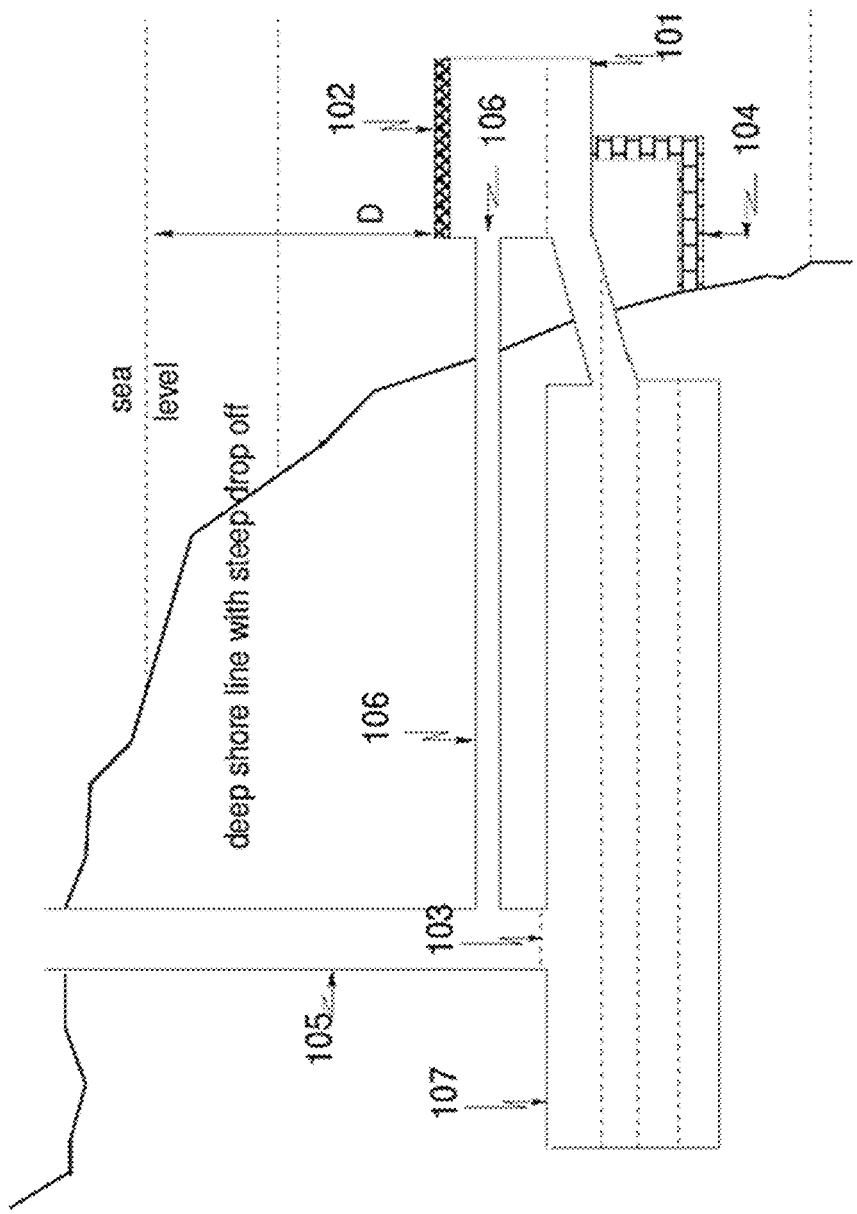
FIG. 5 shows a desalination system installed on a steep sloping terrain.

Alternatively, or in addition, the reservoir(s) could be created under-ground if the geography includes steep shoreline; as is the case in California and the west coast of the USA; such as for example described with respect to FIGS. 4 and 5 in this document.

The surfaces across which the RO filtration occurs can be composed of tiles of various shapes, sizes and orientations that are optimized individually or in groups.

Experience with current land-based RO systems shows that the RO membranes can fail for various reasons and need to be replaced as part of regular maintenance. This task is substantially harder when the membranes are approximately 260 meters deep in the ocean. Accordingly, the vessels or collection pods can be housed in small retractable modules. For example, one possibility is to create two gigantic concentric tubes; wherein the volume between the tubes is empty (at atmospheric pressure) and deploy the actual collection pods in retractable structures that are deployed along both the cylindrical surfaces (of the inner as well as the outer tube). The space between the tubes can be optimized for humans and/or robots to able to access and easily replace pods/membranes as and when needed.

To further illustrate variations in the embodiments of the main idea, note that any land based RO system necessarily contains a path to circulate pressurized water around the membranes. In principle, the entire Land based RO apparatus could be housed in a holding structure with sufficient space around the apparatus for humans and robots to perform regular maintenance as they currently do on land. The pressurizing pumps can simply be replaced by valves that simply "connect" the pressurized water path to the ambient ocean for normal operation; and disconnect the pressured-water-path from the ocean as and when needed for maintenance. Note that the requisite pressure naturally exists as the hydrostatic pressure which is omnidirectional and always present so that there is no need to spend any energy to pressurize the saline water. Instead a smaller amount of energy (smaller than the amount of energy required to pressurize and force-filter the seawater) is required to "lift" the filtered water that collects at a depth D in the collection reservoirs.

Figure 2A:
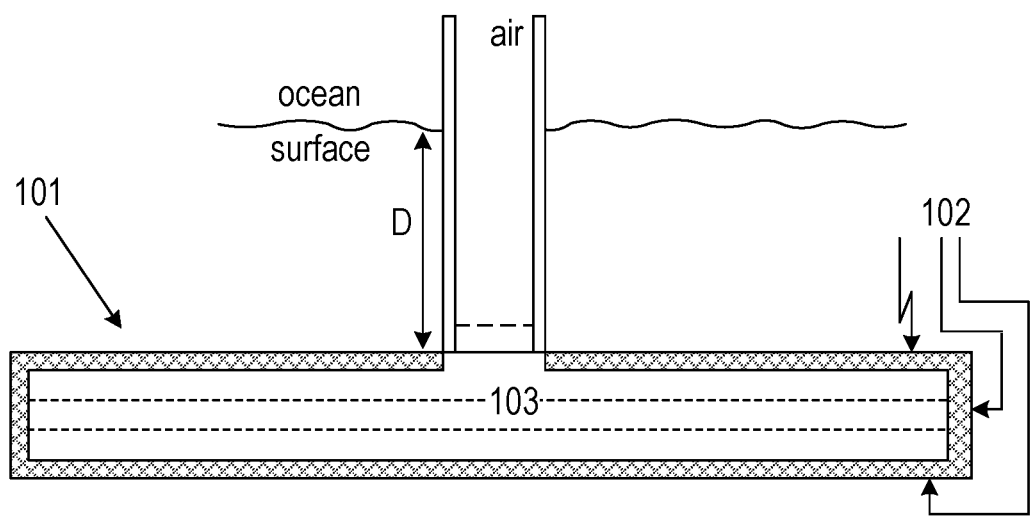
FIGS. 2A-2B show examples of size and/or shape of the vessel and the placement of membranes can be optimized in any manner.

In FIG. 2A, a configuration is disclosed in which desalinated water 103 is collected into the chamber 101 which is enclosed except for an opening towards a top side. The enclosure is fitted with RO capability and is water-tight with respect to the outside. The chamber 101 is connected to a pipe at the opening, where the pipe extends upwards and is able to reach water surface during operation. During operation, the chamber is submerged underwater at critical depth D. The water pressure will cause ocean water to be osmotically filtered through the osmotic membrane 102 surrounding the chamber. After the desalinated water is available inside the chamber, a suitable pumping mechanism may be used to pump the water through the opening and the connecting pipe.

Figure 2B:
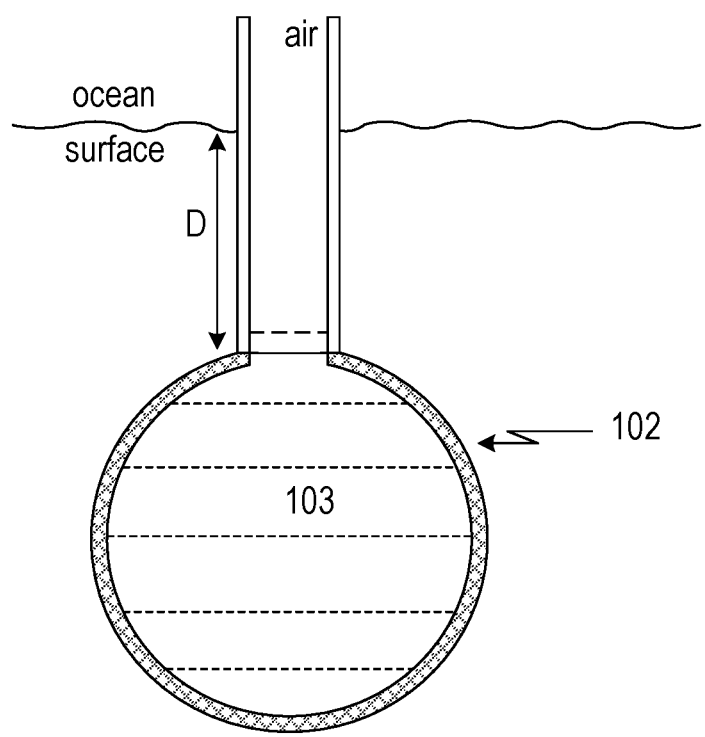

FIG. 2B shows an arrangement similar to FIG. 2A, except the chamber in this case is spherical in shape. Depending on surrounding terrain and other considerations, various embodiments may find chamber shapes as depicted in FIGS. 2A-2B as the appropriate choice. For example, spherical shaped chamber may uniformly distribute the pressure across the spherical surface from all directions. Also, a sphere maximizes the ratio of (volume enclosed)/(surface area), providing operational benefits.

The desalination vessel(s) can be anchored in a number of ways as illustrated in FIGS. 3A-B.

In a stand-alone configuration, a vessel can itself be directly anchored to the bottom of the sea as shown in FIG. 3A. As shown in FIG. 3A, anchor 104 is used to tether the main vessel 101 to ocean floor and allow the main vessel to be submerged to at least the critical depth to allow RO filtration to take place.

Multiple vessels could be anchored to the foundations of wind-mills in an offshore wind farm that are preferably anchored into the bed rock at the bottom of the sea; as shown in FIG. 3B.

Multiple vessels could be anchored to a deep-water oil and/or gas and/or shale and/or hydrates or any other off shore drilling and/or deep sea mining structure.

Multiple vessels could be anchored to any part of an under-sea transportation tunnel, or pipe-line(s), or under-sea cables; or any other rigid under-sea structure which is wholly or partly submerged at a depth d>D under the water surface.

On the west coast of the USA, there is not much of a continental shelf (which is a relatively flat and shallow area under the sea, with an average depth of about 100 to 150 meters below the surface of the sea; that extends anywhere from 10s to 100s of miles into the ocean from the shore line. The precipitous drop to deep ocean depths of 2 to 3 miles or more typically occurs after the end of the continental shelf). The east coast of the USA has a distinctly identifiable continental shelf. In contrast, the west coast does not have a continental shelf. In other words, on the west coast, the water depth simply keeps on increasing all the way to the deep ocean bottom levels with steep slopes near the shore line.

The wind-mills in modern off-shore wind-farms that generate electricity (from off-shore wind energy) need to be firmly anchored to the bed-rock under the sea bottom. The shallower the bottom; the easier it is to reach the bed-rock and therefore wind-farms are easier and substantially cheaper to construct; operate and maintain on the east coast of USA.

This is one of the reasons why off-shore wind-farms have not yet been planned on in the Pacific Ocean off West coast of USA.

In this type sleep-sloping terrain, the vessel could be anchored to "sloping land" as shown in FIG. 4.

FIG. 4 shows an example embodiment in which vessel(s) can be anchored directly to the rocks on land of a steeply-sloping shore line. The anchors may be flexible to allow the main vessel to move in response to ocean movements.

If steep sloping land reaches the right depth (d>D); then the "collection of filtered water could be done in an underground reservoir dug on the land; thereby minimizing the part of infrastructure that has to be positioned in the ocean. This is shown in FIG. 5. As shows in this figure, water that is filtered through the membrane 102 may be filtered to fall vertically into the chamber 101 through a conduit that is also coupled to a fresh water outlet to equalize pressure. The vertically falling filtered water may be collected temporarily in the main vessel 101, and may further be pushed towards the underground reservoir 107 due to gravity. The water 103 in the ground reservoir may be pumped out through the service shaft using a pumping mechanism.

The pressure differential required to sustain Reverse Osmosis could be easily achieved on land simply by erecting a column of sea water which has a height=D or more.

Figure 6:
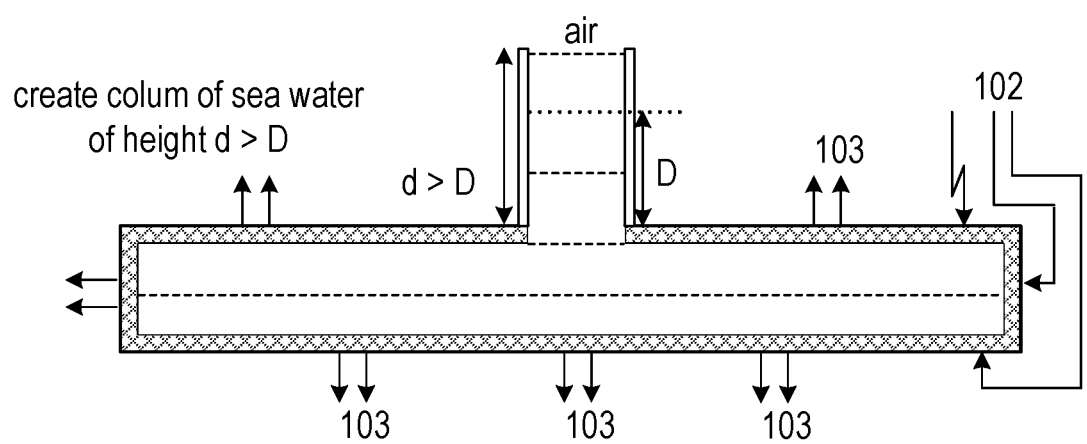
FIG. 6 shows an example of another desalination system.

Such a column could be housed inside a humanly created structure of height d>D as illustrated FIG. 6.

FIG. 6 shows a simple alternative to going off-shore: erect the column of height d>D on land on or near the sea shore, and keep filling it with sea water. Arrows show filtered water (103) coming out of the osmotic membranes (102). The diagram is not drawn to scale. Also, the pumping equipment and pathways, the spaces to collect filtered water and eject the salt rich effluent stream(s) are omitted for the sake of clarity.

In some embodiments, if there are hills of height D or more near the shore-line; then a small reservoir of sea water could be created at any desired height d and pipes (rigid or flexible) that run from the bottom of the reservoir down the hill to the shore could be used to deliver pressurized water to the osmotic membranes.

In such embodiments, the total energy may be higher than the previously described schemes; because sea water has to be pumped to a height D or more; and sea water is heavier than filtered water.

Additionally, on-land version creates an effluent stream which is more concentrated than sea water. This stream must be transported back into the sea or dealt with in some other manner on land. This task typically requires additional energy to be spent; thereby further reducing the energy efficiency.

However, the on-land version would be ideal in a try-out phase to validate the ideas and then to ramp up the scale.

If there the sea remains shallow for a considerable distance off-shore from where the desalination is required; then the on-land version might be better than the sea-submerged versions.

Some Deployment Examples

As previously mentioned, the east coast of USA has a fairly big continental shelf. As a result, the sea depth is typically no more than about 50 to 100 meters for up to about 100 miles into the ocean. This shallow depth in turn facilitates direct anchoring of the large wind-mills (blades in 20+ meters range) to the bed rock at the bottom of the sea; since the sea floor is not too deep. Accordingly, Off-shore wind-mill farms that harness wind energy to produce electricity have been designed and built on the east coast. A good example is the Block Island wind farm off the coast of Rhode Island.

On the west coast of the USA, however, there is no continental shelf; rather, the depth increases rapidly off the shoreline. Consequently, anchoring the wind-mills will require substantially deeper foundations which substantially raises the infrastructure cost. This is the reason behind the fact that offshore wind energy farming is being more aggressively pursued on the east coast rather than the west coast.

For the west coast, we therefore propose to combine the novel desalination infrastructure unveiled herein (as illustrated in FIG. 3B for example) with off shore wind mills. With this unique combination; the infrastructure cost can be amortized across multiple synergistic product lines (electricity and/or potable-water).

Next, we demonstrate that using the electricity generated by the wind mill(s) to lift filtered water to the surface and deliver it to shore in Southern California and selling the de-salinated water (instead of selling the electricity) can yield a substantially higher revenue: at least 5.7638 TIMES (576.38% of) the revenue that can be generated by directly selling only the electricity generated by windmill farms.

In particular we focus on San Diego where large scale de-salination plants are being considered. To begin with, we first derive a sufficiently accurate estimate of the critical Depth D required to start and sustain RO in the local conditions in the ocean near San Diego.

In La Jolla, the maximum sea-temperature is about 22 Celsius in the first week of September. The average year-round temperature is about 17 degrees Celsius and therefore this is the temperature value that we use to estimate the density of sea-water; which in-turn determines the critical depth D.

Sea water temperature also changes with depth. However; the thermocline of the ocean near San Diego indicates that for depths less than about 500 meters, the sea temperature does not decline much, it is pretty much the same as the surface temperature. Hence, the same temperature value (17 Celsius) can also be used up-to depths of at least 300 Meters below the sea-surface.

At this operating point, the Osmotic pressure turns out to be about 25.8272 Atmospheres.

Assuming the density of sea-water to be about 1.025;

The critical depth D at which RO is sustainable off the coast of San Diego:

$$D \approx 260.522 \text{ Meters} \tag{14}$$

Next, we estimate the amount of water that can be lifted using the electricity that a modern wind-mill can generate. A modern wind mill is a large structure (often blades are greater than 10 meters in length) and can produce substantial amount of electricity. For instance, every single individual wind mill in the Block Island energy farm generates up to 6 Mega Watts of power when in operation.

For the sake of generality, assume that each wind mill generates G Mega-Watts when in operation.

Therefore, the total amount of electrical energy generated by such a wind mill in 1 hour is: $E_h = G \times 10^6 \times 3600$ Joules $= (G \times 3.6 \times 10^9)$ Joules $\tag{15}$ Next, suppose all the electricity generated by the wind mill is used to lift de-salinated water to the surface. We estimate how much water (both mass and/or volume) can be lifted every hour with the $E_h$ Joules generated by the wind mill. Assuming that the critical depth is D Meters, we first evaluate the energy that is required to lift 1 $M^3$ (i.e. 1 cubic meter) of filtered (pure) water to the surface:

Let $e_w$ = energy required to lift 1 $M^3$ of filtered water through D Meters then $$e_w = m \cdot g \cdot D = (10^3 \text{ Kg}) \times \left(9.8 \frac{M}{s^2}\right) \times (D \text{ Mtrs}) = (800 \times D) \text{ Joules} \tag{16}$$

In the above equation, we have used the fact that the mass of a cubic meter of filtered (pure) water is 1000 Kg.

From Relations (15) and (16), it follows that the amount (i.e., the volume) of filtered water that can be delivered per hour (at the surface) is $$V_h = \frac{E_h}{e_w} = \frac{3.6 \times 10^9 \times G}{9800 \times D} = \left(367346.9388 \times \frac{G}{D}\right) \frac{M^3}{hr} \tag{17}$$

To get a better idea of the volume delivered, we convert it into gallons.

Since 1 cubic meter=264.172 gallons therefore $$V_h = 367346.9388 \times \frac{G}{D} \times 264.172 \text{ gallons/hr} \tag{18}$$

$$= 9.704277552 \times 10^7 \times \frac{G}{D} \text{ gallons/hr}$$

If G=6 and D=300; then the value on previous line works out to =2.079488047 Million gallons per hour.

Another interesting benefit to note is the economic advantages of the proposed scheme.

We demonstrate that the ratio of revenue earned by selling the desalinated water to the revenue earned by selling the electricity generated by the wind mill is about 5.76 (or in other words 576%).

Let $R_e$ = revenue earned per hour by selling the electricity generated by the wind mill versus $R_w$ = revenue earned per hour by using all that electricity to lift desalinated water and selling that potable water.

Then, we are interested in evaluating the ratio $$r = \frac{R_w}{R_e}.$$

To generate the worst case (most conservative) estimate of r, we use the highest rate (i.e., price) listed for a Kw-hr (Kilo Watt hour) of energy sold by San Diego Electric and Gas company (the utility company); and the lowest rate charged by the City of San Diego for potable water.

The rates are publicly available on web sites of electric and water utilities that supply electricity and water to the greater San Diego area.

In October 2017, the rates were:
best (highest) electricity rate=$0.42 (i.e. 42 cents) per Kilo-Watt-hour
worst (lowest) potable water rate=$4.842 per HCF, where, 1 HCF=745.05 gallons.

Using the above values the revenues earned per hour are:

$$R_e = (GMW) \times (0.42 \text{ dollars/KW-hr}) \tag{19}$$
$$= (1000 \times GKW) \times 0.42 \text{ dollars/KW-hr}$$
$$= (\$420.0 \times G) \text{ per hour; and;}$$

$$R_w = \left(\frac{4.842}{745.05} \text{ dollars/gallon}\right) \times (V_h \text{ gallons/hour})$$

plugging the expression from $V_h$ from (18) above, it is seen that $$R_w = \left(\$630670.5846 \times \frac{G}{D}\right) \text{ per hour} \tag{20}$$

and consequently, the ratio r is $$r = \frac{1501.596630}{D} \tag{21}$$

Using the value of critical depth from (14); the ratio is $$r = 5.763804487 \Rightarrow r > 5.76380 \tag{22}$$

Note that the ratio is independent of the generating capacity G; it depends only on the critical depth D. However, the higher the generating capacity; the lower the amortized cost of creating the infrastructure. For example, newer wind-mill designs such as the MHI-Vestas V164-9.5 MW Turbine have been unveiled in 2018. This capacity is substantially larger than the capacity of the wind-mills deployed prior to 2017; which is approximately 6 MWs per single 3-blade wind-mill.

Thus, the revenue earned by directly selling the electricity is drastically smaller than the alternative, wherein, all the electricity generated by the wind mill is used to lift the de-salinated water to the surface and the potable water is sold as (an extremely valuable) commodity. The ratio is higher than 5.7638. In other words, coupling wind mills with the new desalination method unveiled herein will increase the revenue earned at least by A FACTOR of 5.7638, or equivalently at least to 576.38% of the original.

Even if a highly conservative value D=300 Meters is used, the ratio r=5.005322100⇒r>5.0=500%

To illustrate the robustness of the potential revenue increase; we re-express the ratio r in terms of the cost of electricity and cost of water as variables.

Let k≡dollar cost of a Kilo-watt-hour of electricity; and $$t \equiv \text{dollar cost of one HCF of potable water} \tag{23}$$

Then it can be easily verified that
$R_e = 1000 \times k \times G$ per hour; and;

$$R_w = 130250.0175 \times t \times \frac{G}{D} \text{ per hour;}$$

so that the ratio r turns out to be $$r \equiv \frac{R_w}{R_e} = \left(\frac{130.2500175}{D}\right) \times \left(\frac{t}{k}\right) \tag{24}$$

Assuming a very conservative value of D=300 Meters;

$$r = 0.4341667250 \times \left(\frac{t}{k}\right) \Rightarrow r > 1 \text{ only if } \frac{t}{k} > \frac{1}{0.4341667250} = \tag{25}$$
$$2.303262646$$

For a different perspective, note that the current value of the ratio of the cost of water t (in the units of dollars per HCF) to the cost of electricity k (in the units of dollars per Kilo-Watt-hour) in San Diego is $$\frac{t}{k} = \frac{4.842}{0.420} = 11.52857143 \tag{26}$$

Therefore, it is clear that the cost of potable water relative to the cost of electricity has to reduce by a FACTOR OF 5.005322101 (i.e. at least by 500%) with respect to their current relative values; in order for the sale of electricity to be profitable vis-a-vis the spending or utilizing all that electricity to simply "lift" the RO generated potable water to the shore and the sale of that water.

As a concrete example of the robustness of the increased revenue potential, we re-calculate the ratio r with the current rates. The rates changed in 2018; the new rates are:
the highest electricity rate=$0.53 (i.e. 53 cents) per Kilo-Watt-hour.

The (current) lowest water rate=$4.948 per HCF, as published at the official web-site of the city of San Diego.

With the new values; the ratio turns out to be about 4.668 (i.e. an increase to 466%).

Note that in San Diego, in one year, the highest rate of electricity (usage at peak demand times) increased by a factor which is larger than the corresponding factor by which the cost of water usage increased. This is most likely an anomaly (local politics and other factors led to an agreement that let the electric utility adjust/raise the rates in 2018. It is unlikely that such differential increases/adjustments will be agreed to in next year or even the next 3 to 5 years).

Furthermore; the ratio $r_{av}$ based on the average rate for electricity (not the highest); and the average rate of water did not increase by the same amount as r.

The current trends show that the cost of pretty much any method of electricity generation continues to go down. For example, solar-cells, wind energy, electricity generated by burning oil and/or natural gas and or hydrates obtained by seep sea drilling; all continue to go down.

On the other hand, the cost of water has been steadily increasing. It is possible that the next war(s) could be caused by disputes over water. For example, California, Arizona, Colorado and Nevada are in a sort of permanent tussle over their share of the water of the Colorado River.

Another example: India has negotiated treaties with its neighbors: with Pakistan over sharing the water from the Indus and other rivers that flow westward out of Punjab; and sharing the water of the Ganges with Bangla Desh.

In other words, it is highly likely that the cost of potable water (relative to the cost of electricity) will continue to increase over the foreseeable future (not accounting for the drop in the price of water that might be caused by the delivery of water generated by large scale RO desalination itself). The increased revenue potential identified in this document is therefore likely to persist for the near foreseeable future.

Therefore, the stream of additional/enhanced revenue is likely to be permanent (for all practical purposes).

The coupling of wind mills to the desalination methods disclosed in the present document together constitutes a self-sustaining infrastructure. After the infrastructure is created and functional, the only costs are periodic maintenance and/or replacement of the osmotic membranes, cleaning/maintenance of the blades of the wind mills, etc. The energy needed to lift the filtered water is provided by the wind mills. Thus, there may not be a need to continually spend energy on-shore (which is one of the biggest advantages of the new method). Note that the carbon foot-print of this particular combination is practically ZERO.

Of course the infrastructure we envisage is flexible: if there is excess electricity generation capacity (i.e., there is more electricity left over after lifting all the water that can be filtered) then it should be possible to either sell the left over electricity directly to the grid or to use it to charge batteries or to store it in some other form so that it could be used at a later time.

On the other hand, if there is not sufficient wind; then the plant must be able to use electricity from the grid to lift water to the surface as and when required.

Examples of Extensions

1) Note that many places that have a dearth of water (such as Southern California; the Atacama desert in South America; Cypress; Israel, Libya; most mid-eastern and Arab countries, such as Saudi Arabia, Iraq, Iran, Kuwait, UAE, Dubai, etc.; the western shoreline (ghats) of the state of Maharashtra in India; and many others) happen to be adjacent to oceans or seas; and also receive a lot of sunshine either throughout the year or for a major portion of the year.

Therefore, at all such places, there is a strong potential for plenty of solar power generation; both on-shore as well as off-shore. The solar power generation can be coupled and/or combined with off-shore wind mills and desalination.

Consequently, a further extension of the disclosed techniques is to cover large area(s) within and/or near the off-shore wind farm with solar panels. For example, solar panels could be anchored to the foundations of the wind mill towers at optimally designed heights (for instance, sufficiently above the sea level to clear the waves, but below the blades of the wind mills; so that the solar panels do not obstruct either the blades or the wind flows). In principle, the entire area between all wind mills could be covered with solar panels in this manner.

2) Yet another slew of obvious extensions is to incorporate any; or any group of; or all of the other known mechanisms of harvesting energy from the sea; including mechanisms to harvest tidal energy or wave energy etc.; in the wind-mills and desalination infrastructure.

3) It may also possible to combine the de-salination method and apparatuses with any other on or off shore form of electricity generation, including, for example, nuclear plants, or natural gas or deep-water oil rigs, etc. which can result in varying degrees of carbon foot-prints.

4) As demonstrated in the present document, a desalination apparatus can itself include a large reservoir of filtered water (at a depth D or lower). Since filtered water is lighter than sea-water; it is possible to create a "floating" reservoir of potable water anywhere in the ocean (as long as the depth is greater (than D, thereby providing fresh water reservoir of depth d-D). Such floating reservoirs could be anchored by chains to the bottom of the ocean. These reservoirs could be used supply the potable water required by ships (especially the mega cruise ships that have swimming pools and even water rides on board).

5) Note that all off-shore components (as well as on-shore structures) always get coated with salt. The methods and apparatuses make it possible to use a small amount of the filtered water to simply wash-off (for example, by force-spraying) the structures at any time.

6—a) Big navy ships including aircraft carriers and/or submarines, especially the big "boomer" submarines that carry ballistic nuclear missiles and remain hidden deep under water for months at a stretch; could also deploy Reverse Osmosis based desalination to reduce their energy consumption.

6—b) Additionally, when ships are traveling at full speed, hydro-dynamic pressure could be exploited together, synergistically with hydro-static pressure to achieve desalination at significantly shallower depths.

6—c) Irrespective of how big they are, most commercial (non-military) ships deploy conventional fossil fuels such as diesel; rather than using nuclear reactors as their primary source of energy. It is likely that commercial ships (especially big cruise ships with thousands of people, swimming pools and water-slides and rides, and even gardens with terrestrial trees/forests/grasses/vegetation on board) could also find it beneficial to use RO based desalination to meet their ever increasing sweet water needs.

7) Any future membrane improvement or potential other enhancements such as a synergistic combination of electro-dialysis and RO to lower the pressure differential at which RO can occur; can also be integrated in our design. In fact, any such improvement may be used for reducing the critical depth D.

FIG. 7 is a flowchart for an example method 700 for desalination of ocean water.

The method 700 includes providing (702) a structure having a reverse osmosis membrane affixed to a first end, submerging (704) the structure to a depth in a reservoir of salt water, wherein the depth is a function of a critical pressure of activation of operation of the reverse osmosis membrane, allowing (706) a hydrostatic pressure at the depth to force salt water from the reservoir through the reverse osmosis membrane to cause fresh water to accumulate within a cavity on an inside of the structure; and making (708) the fresh water available for an external use.

In some embodiments, the structure is elongated and the first end is a bottom surface of the structure.

In some embodiments, a shape, a size or an orientation of the structure is optimized for an energy efficiency and/or an ease of membrane replacement or a maintenance.

In some embodiments, the structure comprises multiple structures or collection pods configured to deliver the fresh water into a storage tank for holding the fresh water before it is lifted/raised through a height D and made available for external, for example by lifting to a surface of the reservoir for the external use.

In some embodiments, the making the fresh water available for external use is performed by pumping the fresh water out of the cavity.

In some embodiments, the making the fresh water available for external use is performed by pumping the fresh water out of a holding tank, and wherein the holding tank is under water or under-ground near a steep shoreline.

In some embodiments, the pumping is performed using a renewable energy resource.

In some embodiments, the reservoir of salt water is open sea and the structure is affixed to sea floor.

The following technical solutions may be used for desalinating ocean water.

A desalination apparatus comprising an elongated structure having a first end submerged undersea at a depth D, and a second end at or above sea water level, a reverse osmosis membrane affixed to the first end, and a water pump coupled to an inside cavity of the elongated structure and configured to pump water from the inside cavity towards land. Here, the depth D is sufficient to allow reverse osmosis to occur across the reverse osmosis membrane due to pressure differential across the reverse osmosis membrane.

The desalination apparatus as above, further including a renewable energy source coupled to the water pump and providing power for operation of the water pump.

The desalination apparatus as above, wherein the renewable energy source is a windmill.

Embodiments that use the disclosed desalination method have some significant environmental advantages: all other terrestrial methods known to date have the big problem of how to handle the effluents with high concentrations of salt and other impurities. Also, the plants consume huge areas on land. Our (sea-submerged) methods automatically solve the effluent disposal problem and require minimal real estate on shore. These benefits alone might make it worthwhile to think of moving all desalination plants off-shore using the method(s) disclosed herein.

It will be appreciated that a method to co-generate desalinated water together with any resource from the deep ocean, including natural gas, and/or crude-oil and/or hydrates and/or rare minerals, is simply by using the methods described herein so that the cost of the infrastructure needed can be amortized over at least two independent and valuable products that can be sold.

We have unveiled a method to co-generate at least 3 distinct products: (1) desalinated water, (2) electricity and (3) natural gas and/or deep sea crude-oil, wherein, even the small amount of natural gas or oil that is necessarily wasted (burned as a small plume/pilot to relieve excess pressure) is instead put to use to lift the filtered water by coupling the energy wasted in pressure relief plumes with electricity generated by renewables.

Co-locating acqua-farms and/or fisheries and/or other installations around the de-salination infrastructure to benefit from the synergy of multiple independent product lines thereby reducing the overall cost.

Co-locating eco-tourism resorts wherein the environmentally conscious types can appreciate the beauty and simplicity of the basic laws of physics harnessed to solve a pressing human need.

In essence we have shown entire new paradigms to opportunistically integrate synergistic mechanisms to solve a pressing human problem: our ever increasing need for potable water.

It will be appreciated that a method to co-generate desalinated (fresh) water together with electricity wherein the amount of water and electricity generated and/or sold can by dynamically optimized to maximize revenue/profits is disclosed.

It will be appreciated that a method to co-generate desalinated water together with any material or resource from the deep ocean, including natural gas, and/or crude-oil and/or hydrates and/or rare minerals is disclosed. This can be achieved by using the methods described herein so that the cost of the infrastructure needed can be amortized over at least two independent and valuable products that can be sold.

It will be appreciated that a method to co-generate at least 3 distinct products is disclosed. The products include (1) desalinated water, (2) electricity and (3) natural gas and/or deep sea crude-oil. In this method, even the smallest amount of natural gas or oil that is necessarily wasted (burned as a small plume/pilot to relieve excess pressure) during conventional extraction process is put to use to lift the filtered water by coupling the energy wasted in pressure relief plumes with electricity generated by renewables.

It will be appreciated that a method that provides technical solution to amortize the cost of any deep-sea infrastructure for any purpose such as a transportation tunnel over an independent highly profitable commodity, e.g., sweet water or potable water, is disclosed. The method includes generating potable de-salinated water, simply by anchoring the de-salination apparatuses demonstrated herein to the deep sea infrastructure originally intended for any other purpose.

It will be appreciated that a method may include performing desalination as above and include co-locating aqua-farms and/or fisheries and/or other installations around the de-salination infrastructure to benefit from the synergy of multiple independent product lines thereby reducing the overall cost is disclosed.

In some embodiments, the above-described methods may be used for co-generating desalinated water, electricity, and natural gas/crude oil; wherein fresh water is made available for external use by pumping using an energy released during natural gas or crude oil generation. For example, such energy release in the conventional systems is made in the form of wasted energy of production in the form of plumes of gas burnt from chimney exhausts, or pressure release valves. Currently, this energy is simply wasted. The methods disclosed herein make it possible to instead harness that wasted energy to lift filtered water by coupling it with renewable forms of energy such as off-shore wind. In other words, a synergistic integration of wind-mills together with deep water oil/gas drilling rigs can minimize the energy wasted during the production of oil/gas thereby lowering the carbon foot-print.

In some embodiments, the structure used for desalination may be tethered to another underwater structure that is used as a transportation tunnel or an underwater cable link or an underwater computing platform (e.g., underwater server farms).

It will be appreciated that a method of desalinating ocean water using the above-described desalination apparatus is disclosed.

Concluding Remarks

Some scientists think that the label "earth" is wrong. Our planet should have been called "ocean" or "water"; not only because 78% of its surface is covered with water but also because water in all 3 of its forms (solid, liquid and gas/vapor) are sufficiently abundantly present on our planet. The latter being a precondition for the evolution and sustenance of life as we know it. There is a belief among many planners that humans would have to find ways of living in the sea in the not too distant future. Undertaking infrastructure projects such as those proposed in this document will go a long way toward furthering the goal of living with; as well as living in the sea: for example; aqua farms of various types could be co-located with the off-shore wind-solar electricity production and desalination.

Finally in the future when humans explore other planets, the same idea illustrated in FIG. 1 can yield both potable water as well as net energy production: if the depth is greater than about 12 km; then the column of filtered water inside the tube rises to a height GREATER THAN the surface level of the ocean. This water at a height can turn a water-wheel producing net energy. This scheme is not feasible on earth because the depth of the oceans is not sufficient. However, on some moons of Jupiter and/or Saturn, it is believed that oceans of liquid water exist that could be 100s of kilometers deep. If that is the case and the temperature and salinity turn out to have the requisite values, then those deep oceans can be harnessed to create a practically unlimited supply of human consumable water as well as small amounts of energy.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

The invention claimed is:
1. A method of desalinating ocean water, comprising:
providing a structure having a reverse osmosis membrane affixed to a first end, wherein the structure comprises a first tube inside a second tube;

submerging the structure to a depth in a reservoir of salt water, wherein the depth is a function of a critical pressure of activation of operation of the reverse osmosis membrane;

allowing a hydrostatic pressure at the depth to force salt water from the reservoir through the reverse osmosis membrane to cause fresh water to accumulate within at least one collection pod deployed on the first tube or the second tube, wherein the at least one collection pod comprises a housing retractable through a surface of the first tube or a surface of the second tube;

wherein a spacing between the first tube and the second tube allows a human or a robot to access and replace the at least one collection pod;

and making the fresh water available for an external use.

2. The method of claim 1, wherein the structure is elongated and the first end is a bottom surface of the structure.

3. The method of claim 1, wherein a shape, a size or an orientation of a vessel of the structure used during desalination is optimized for an ease of membrane replacement or a maintenance.

4. The method of claim 1, wherein the at least one collection pod is configured to deliver the fresh water into a storage tank for holding the fresh water before it is lifted/raised through a height D to a surface of the reservoir for the external use.

5. The method of claim 1, wherein reverse osmosis occurs across a surface of the structure composed of tiles of various ranges of shapes, sizes, and orientations.

6. The method of claim 1, wherein the making the fresh water available for external use is performed by pumping the fresh water out of a holding tank, and wherein the holding tank is under water or under-ground near a steep shoreline.

7. The method of claim 1, wherein the making the fresh water available for external use is performed by pumping the fresh water using a renewable energy resource.

8. The method of claim 7, wherein the renewable energy resource is a wind-mill.

9. The method of claim 1, wherein the reservoir of salt water is open sea and the structure is affixed to sea floor.

10. The method of claim 1, including co-generating desalinated water, electricity, and natural gas/crude oil; wherein fresh water is made available for external use by pumping using an energy released during natural gas or crude oil generation either by itself or in combination with one or more renewable energy sources.

11. The method of claim 1, wherein the structure is tethered to another underwater structure that is used as a transportation tunnel or an underwater cable link or an underwater computing platform.

12. The method of claim 1, wherein the making the fresh water available for the external use comprises lifting the fresh water to a surface of the reservoir using electricity generated by a wind mill.

13. The method of claim 1, wherein the making the fresh water available for the external use comprises lifting the fresh water to a surface of the reservoir using electricity generated by solar panels.

14. The method of claim 1, wherein the making the fresh water available for the external use comprises lifting the fresh water to a surface of the reservoir using electricity generated by a wind mill and solar panels.

15. The method of claim 1, wherein the making the fresh water available for the external use comprises making the fresh water available as potable water to ships.

16. A desalination apparatus comprising:
an elongated structure having a first end submerged undersea at a depth D, and a second end at or above sea water level, wherein the elongated structure comprises a first tube inside a second tube;
a reverse osmosis membrane affixed to the first end, and
at least one collection pod deployed on the first tube or the second tube, wherein the at least one collection pod comprises a housing retractable through a surface of the first tube or a surface of the second tube;
wherein a spacing between the first tube and the second tube allows a human or a robot to access and replace the at least one collection pod;
wherein the depth D is sufficient to allow reverse osmosis to occur across the reverse osmosis membrane due to hydrostatic pressure differential across the reverse osmosis membrane.

17. The apparatus of claim 16, further including a renewable energy source coupled to the apparatus and providing power for operation of the apparatus.

18. The apparatus of claim 17, wherein the renewable energy source is a windmill.

* * * * *